US012694413B1

(12) United States Patent
Teppler

(10) Patent No.: US 12,694,413 B1
(45) Date of Patent: Jul. 28, 2026

(54) SYSTEM AND METHOD FOR AI-AUGMENTED DATA BREACH NOTIFICATION COMPLIANCE USING DE-IDENTIFIED HASHING AND TRUSTED TIMESTAMPING

(71) Applicant: Steven W. Teppler, Jacksonville, FL (US)

(72) Inventor: Steven W. Teppler, Jacksonville, FL (US)

( * ) Notice: Subject to any disclaimer, the term of this patent is extended or adjusted under 35 U.S.C. 154(b) by 0 days.

(21) Appl. No.: 19/533,767

(22) Filed: Feb. 9, 2026

Related U.S. Application Data

(60) Provisional application No. 63/887,109, filed on Sep. 24, 2025.

(51) Int. Cl.
| | |
|---|---|
| *G06Q 30/018* | (2023.01) |
| *G06Q 10/087* | (2023.01) |
| *G06Q 10/10* | (2023.01) |
| *G06Q 30/02* | (2023.01) |
| *G06Q 30/06* | (2023.01) |

(52) U.S. Cl.
CPC .................................. *G06Q 30/018* (2013.01)

(58) Field of Classification Search
CPC .................................................... G06Q 30/018
USPC ...................................................... 705/1.1–912
See application file for complete search history.

(56) References Cited

U.S. PATENT DOCUMENTS

| | | | |
|---|---|---|---|
| 5,136,647 A | 8/1992 | Haber et al. | |
| 6,792,536 B1 | 9/2004 | Teppler | |
| 6,898,709 B1 | 5/2005 | Teppler | |
| 6,948,069 B1 | 9/2005 | Teppler | |
| 7,409,557 B2 | 8/2008 | Teppler | |
| 7,890,765 B2 | 2/2011 | Zhang et al. | |
| 8,626,671 B2 | 1/2014 | Federgreen | |
| 10,447,719 B2 | 10/2019 | Smelker et al. | |
| 10,742,518 B2 | 8/2020 | Chen et al. | |
| 10,838,967 B2 | 11/2020 | Wang et al. | |
| 10,904,290 B2 | 1/2021 | Klaedtke | |
| 12,099,600 B2 | 9/2024 | Lunsford et al. | |
| 2016/0300241 A1 | 10/2016 | Federgreen | |
| 2019/0205682 A1 | 7/2019 | Huang | |
| 2025/0259041 A1* | 8/2025 | Crabtree | G06N 3/047 |
| 2025/0384072 A1* | 12/2025 | Bhat | G06F 9/5011 |

FOREIGN PATENT DOCUMENTS

| | | | | |
|---|---|---|---|---|
| IN | 202511053389 A | * | 7/2025 | G06N 50/018 |

* cited by examiner

*Primary Examiner* — Jonathan P Ouellette

(74) *Attorney, Agent, or Firm* — Mandelbaum Barrett PC; Lawrence B. Goodwin

(57) ABSTRACT

Systems and methods are disclosed for determining legally constrained compliance obligations in response to incidents affecting regulated data. The disclosed technology ingests statutory and regulatory source text from multiple jurisdictions and parses the source text at a clause level to extract legally operative obligation clauses as machine-interpretable obligation objects. Each obligation object is associated with predefined categories of regulated data elements and maintained within an obligation graph comprising entities, data elements, incidents, and legally relevant relationships including custody, control, exposure, jurisdictional applicability, and statutory linkage.

30 Claims, 10 Drawing Sheets

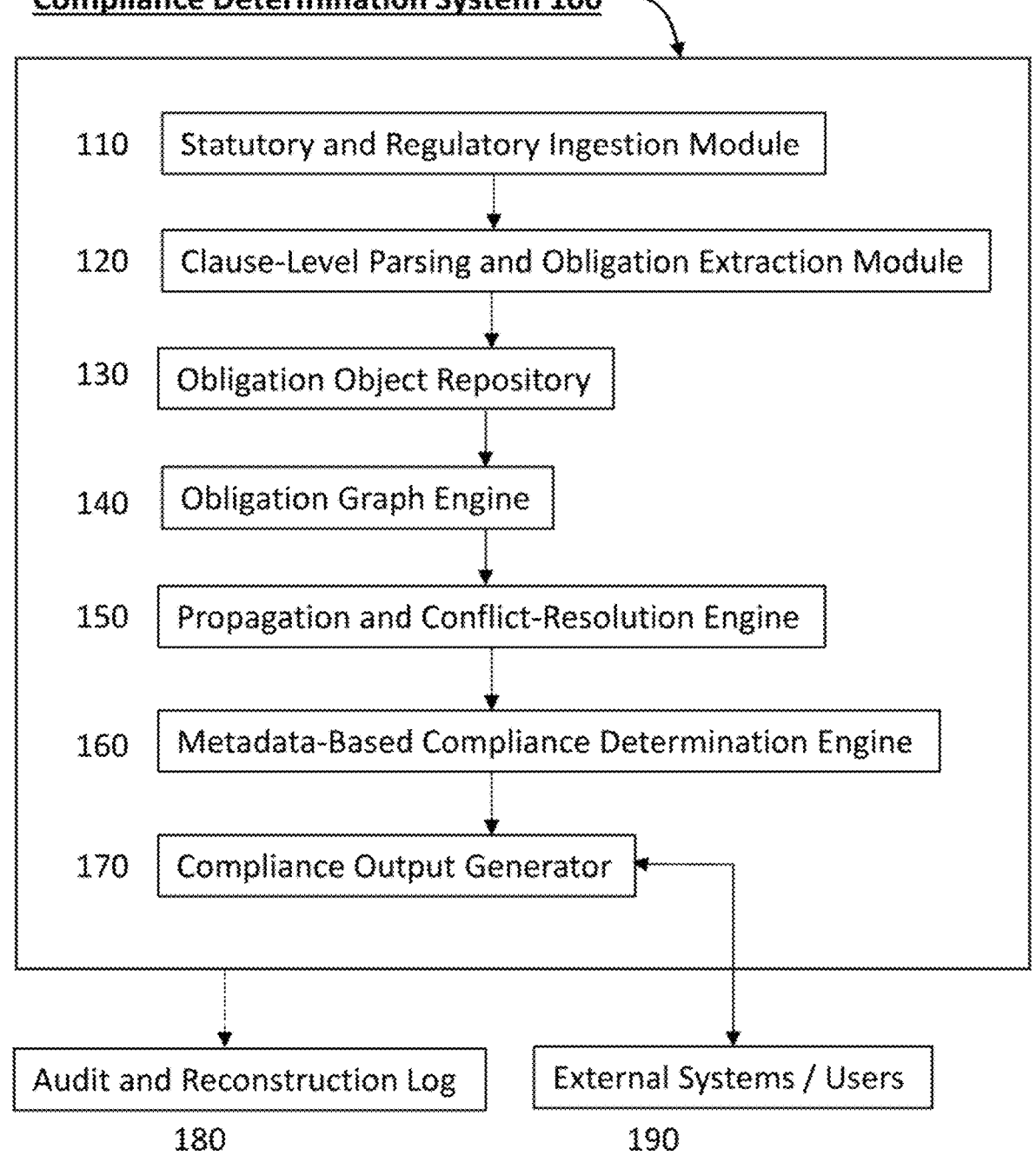

Compliance Determination System 100

110  Statutory and Regulatory Ingestion Module

120  Clause-Level Parsing and Obligation Extraction Module

130  Obligation Object Repository

140  Obligation Graph Engine

150  Propagation and Conflict-Resolution Engine

160  Metadata-Based Compliance Determination Engine

170  Compliance Output Generator

Audit and Reconstruction Log
180

External Systems / Users
190

FIG. 1

Obligation Object 200

210 | Jurisdictional Scope

220 | Triggering Condition

230 | Compliance Requirement

240 | Deadline / Timeframe

250 | Reporting Authority Identifier

260 | Source Text Reference

270 | Version Identifier

Obligation Data Structure

Obligation Propagation Across Entities

Metadata-Only Compliance Determination

Agent-Based Architecture

Statutory Change Detection & NBTC v3 Update

Compliance Outputs & Audit Reconstruction

FIG. 9

Compliance Determination System 900

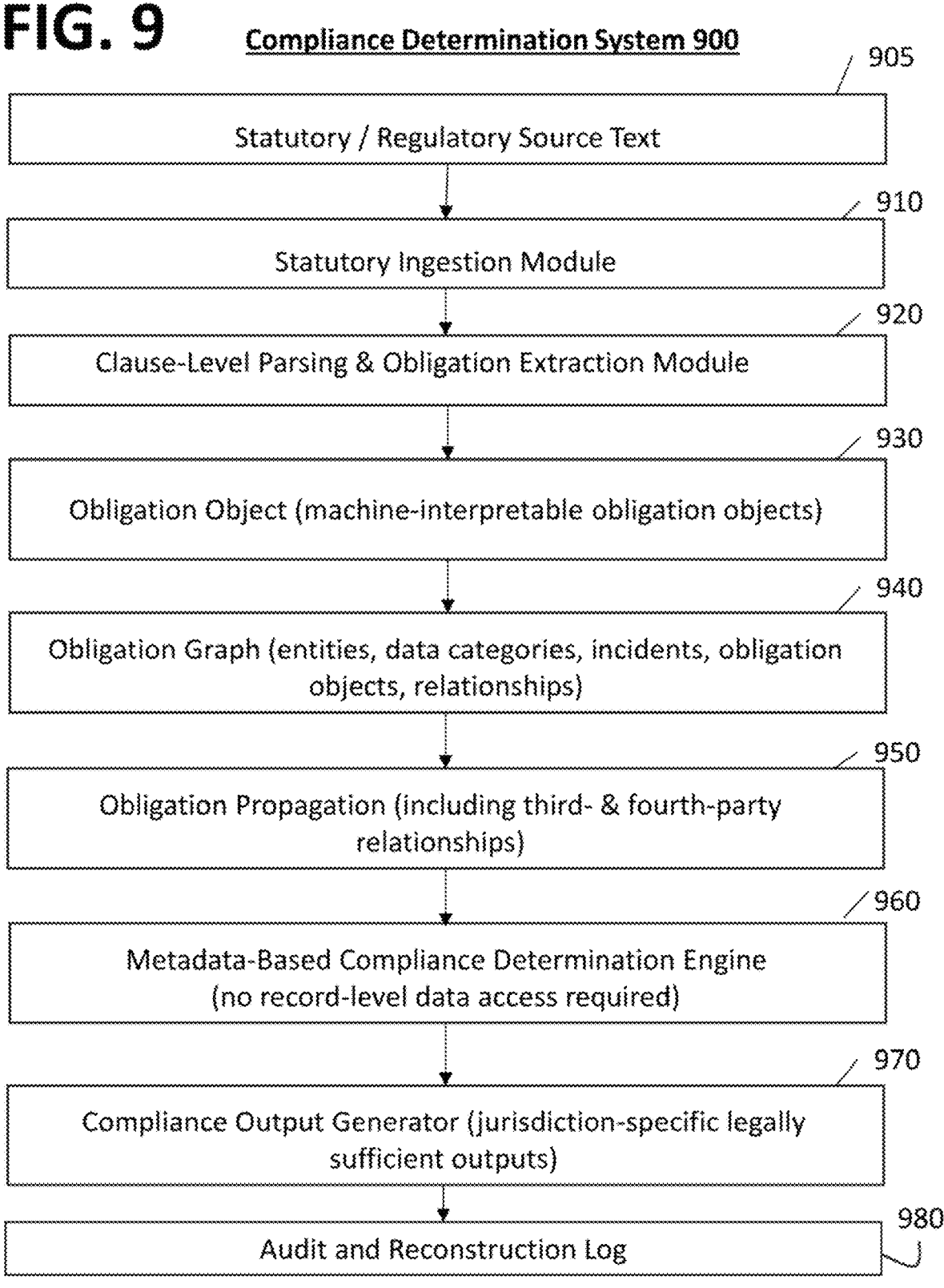

905

Statutory / Regulatory Source Text

910

Statutory Ingestion Module

920

Clause-Level Parsing & Obligation Extraction Module

930

Obligation Object (machine-interpretable obligation objects)

940

Obligation Graph (entities, data categories, incidents, obligation objects, relationships)

950

Obligation Propagation (including third- & fourth-party relationships)

960

Metadata-Based Compliance Determination Engine (no record-level data access required)

970

Compliance Output Generator (jurisdiction-specific legally sufficient outputs)

980

Audit and Reconstruction Log

FIG. 10

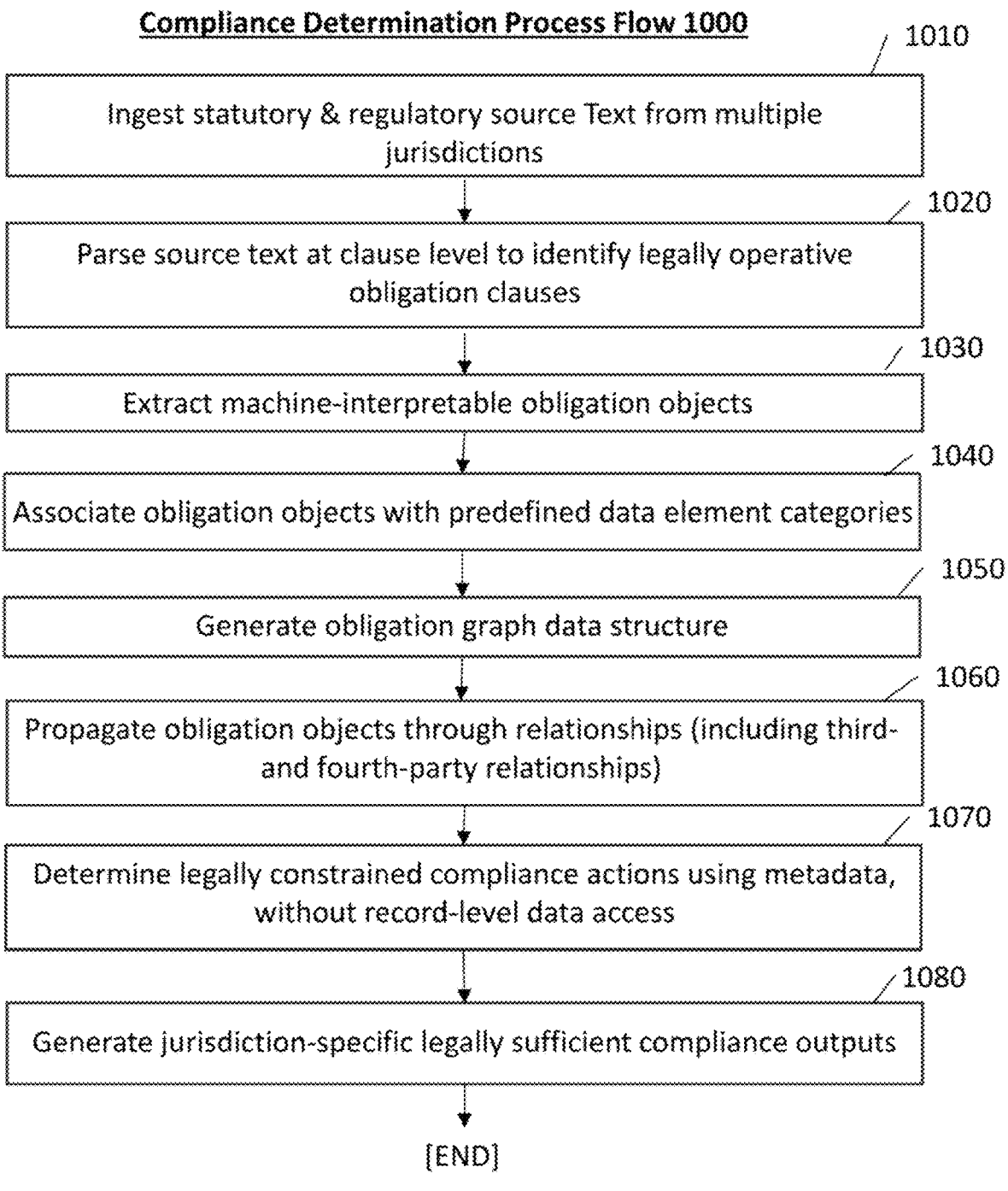

Compliance Determination Process Flow 1000

1010

Ingest statutory & regulatory source Text from multiple jurisdictions

1020

Parse source text at clause level to identify legally operative obligation clauses

1030

Extract machine-interpretable obligation objects

1040

Associate obligation objects with predefined data element categories

1050

Generate obligation graph data structure

1060

Propagate obligation objects through relationships (including third- and fourth-party relationships)

1070

Determine legally constrained compliance actions using metadata, without record-level data access

1080

Generate jurisdiction-specific legally sufficient compliance outputs

[END]

SYSTEM AND METHOD FOR AI-AUGMENTED DATA BREACH NOTIFICATION COMPLIANCE USING DE-IDENTIFIED HASHING AND TRUSTED TIMESTAMPING

CROSS-REFERENCE TO RELATED APPLICATION

The present invention is related to and claims the benefit of the filing date of U.S. Provisional application Ser. No. 63/887,109, filed Sep. 24, 2025, for SYSTEM AND METHOD FOR AI-AUGMENTED DATA BREACH NOTIFICATION COMPLIANCE USING DE-IDENTIFIED HASHING AND TRUSTED TIMESTAMPING, the entire disclosure of which is hereby incorporated by reference.

TECHNICAL FIELD

The present disclosure relates generally to computer-implemented compliance determination systems, and more particularly to systems and methods for computing legally constrained compliance obligations arising from cybersecurity incidents, data exposure events, or loss-of-control events across multiple jurisdictions, entities, and regulatory regimes.

As used herein, an 'agent' refers to a software module executing predefined functions and does not require machine learning or adaptive behavior. Further, references to "artificial intelligence," "AI-augmented," or "agents" refer to software-implemented components configured to perform defined computational functions. Such components may, but need not, employ machine learning, statistical inference, or artificial intelligence techniques. In various embodiments, the disclosed systems and methods may operate using deterministic logic, rules-based processing, heuristic analysis, or hybrid approaches. No embodiment requires training of machine learning models, adaptive learning, or probabilistic inference unless expressly stated. References to 'AI-augmented' or 'agents' refer to software components that may, but need not, employ machine learning or artificial intelligence techniques, and may alternatively operate using deterministic, rules-based, or hybrid logic.

Background and Technical Problems Addressed

Organizations operating in modern data ecosystems are subject to overlapping statutory and regulatory obligations governing data security, breach notification, remediation, documentation, and reporting. These obligations vary across jurisdictions, industries, data types, and entity relationships, and frequently change over time.

Existing approaches to compliance determination suffer from multiple technical limitations, including reliance on static rule sets or manually curated legal databases; inability to operate when record-level data is unavailable, such as during ransomware incidents or third-party lockouts; lack of mechanisms to propagate compliance obligations across vendor, service provider, and sub-provider relationships; absence of machine-interpretable legal representations that persist independently of specific incidents; inability to reconstruct or audit compliance determinations for regulatory or litigation purposes; and fragmentation between legal analysis, incident response, and operational execution.

1. General State of the Art

Nothing in this discussion is intended as an admission that any referenced system, approach, or category constitutes prior art against the present invention. The discussion is provided solely to illustrate technical context and deficiencies addressed by the disclosed systems and methods.

Various computer-implemented systems exist for assisting organizations with regulatory compliance, governance, risk management, and incident response. These systems generally fall into several categories, including legal research databases, rule-based compliance engines, governance and risk management platforms, and incident response or breach notification tools.

While such systems may provide value in isolated contexts, they exhibit significant technical limitations when applied to modern, multi-jurisdictional compliance determination under conditions of uncertainty, partial data availability, or complex third-party relationships.

2. Legal Research and Statutory Reference Systems

Conventional legal research platforms provide access to statutory and regulatory texts, annotations, and commentary. These systems are primarily designed for human consumption and rely on keyword search, document retrieval, and manual interpretation.

Such systems typically treat statutes as static documents rather than machine-operable components; do not extract clause-level legal obligations as persistent computational objects; lack mechanisms to associate statutory obligations with technical data element categories; and do not support automated propagation of obligations across entities or incidents.

Accordingly, legal research systems are not capable of computing legally constrained compliance actions in response to real-time incidents.

3. Rule-Based Compliance Engines

Some compliance platforms employ predefined rule sets to trigger alerts or workflows based on specified conditions. These systems often encode regulatory requirements as static rules tied to specific jurisdictions or industries.

However, rule-based compliance engines generally require manual rule authoring and maintenance; lack clause-level linkage to underlying statutory text; do not model legal obligations as reusable, machine-interpretable objects; fail to support automated recomputation when statutes change; and are unable to operate reliably when record-level data is unavailable.

As a result, such systems are brittle, difficult to update, and ill-suited for dynamic compliance determination.

4. Governance, Risk, and Compliance (GRC) Platforms

Governance, risk, and compliance platforms typically provide centralized dashboards, policy repositories, risk assessments, and reporting tools. These platforms emphasize documentation and oversight rather than real-time obligation computation.

GRC platforms commonly aggregate risk and compliance information without computing legal obligations; rely on manual data entry and human interpretation; lack graph-based modeling of entity and data relationships; and do not propagate legal obligations across third-party or fourth-party ecosystems.

Consequently, GRC platforms cannot determine legally sufficient compliance actions arising indirectly from incidents affecting service providers or sub-providers.

5. Incident Response and Breach Notification Tools

Incident response tools and breach notification services exist to assist organizations in responding to cybersecurity events. These tools often focus on workflow management, forensic coordination, or template-based notification generation.

Such tools typically assume availability of detailed forensic findings and record-level data; require human legal analysis to determine applicable notification laws; do not persist legal obligations independently of specific incidents; and do not support compliance determination under data unavailability conditions such as ransomware.

Accordingly, these tools fail in scenarios where data access is restricted or delayed.

6. Vendor Risk and Third-Party Management Systems

Vendor risk management systems are designed to assess and monitor risks associated with third-party relationships. These systems often track questionnaires, certifications, or contractual terms.

However, vendor risk systems generally do not compute legal compliance obligations; lack mechanisms to inherit or propagate obligations arising from third-party incidents; and treat vendor incidents as informational rather than legally operative events.

As such, they cannot determine downstream compliance duties for client entities affected by vendor incidents.

7. Artificial Intelligence and Machine Learning Approaches

Some systems apply machine learning techniques to classify documents, predict risks, or recommend actions. These approaches often operate as probabilistic black boxes and are not legally constrained.

Such systems do not generate legally sufficient compliance outputs; lack traceability to statutory source text; do not support audit reconstruction; and may introduce unacceptable legal risk due to opacity and non-determinism.

These limitations result in delayed, inconsistent, or legally insufficient compliance responses, increased regulatory exposure, and high operational cost.

The present invention does not rely on unconstrained artificial intelligence outputs and instead employs legally bounded, auditable computation.

The present invention addresses these technical deficiencies by providing a legally constrained, graph-based obligation computation system capable of operating under uncertainty, partial information, and evolving legal requirements.

SUMMARY OF THE INVENTION

In accordance with a first aspect of the present invention, a computer-implemented system comprises one or more processors and one or more non-transitory computer-readable storage media storing instructions that, when executed by the one or more processors, cause the system to: (a) ingest statutory and regulatory source text from a plurality of jurisdictions; (b) parse the ingested statutory and regulatory source text at a clause level to identify legally operative obligation clauses, wherein each obligation clause is extracted as a machine-interpretable obligation object comprising at least a jurisdictional scope, a triggering condition, and a compliance requirement; (c) associate each machine-interpretable obligation object with one or more predefined data element categories representing classes of information regulated by the obligation clause; (d) generate and maintain an obligation graph data structure comprising: nodes representing entities, data element categories, obligation objects, and incidents, and edges representing legally relevant relationships including custody, control, exposure, jurisdictional applicability, or statutory linkage; (e) propagate the machine-interpretable obligation objects through the obligation graph data structure based on the edges to determine compliance obligations applicable to a given entity and incident, including propagation across third-party or fourth-party relationships; (f) determine, using the propagated machine-interpretable obligation objects, legally constrained compliance actions required of the given entity, wherein the determination is performed without requiring direct access to record-level data associated with the incident and instead relies on metadata describing affected data element categories; and (g) generate a compliance output comprising jurisdiction-specific legally sufficient instructions, notices, or reports corresponding to the determined compliance actions.

In accordance with another aspect of the present invention, computer-implemented method for determining legally constrained compliance obligations comprises (a) ingesting, by one or more processors, statutory and regulatory source text from a plurality of jurisdictions; (b) parsing, by the one or more processors, the ingested statutory and regulatory source text at a clause level to identify legally operative obligation clauses, and extracting each identified obligation clause as a machine-interpretable obligation object comprising at least a jurisdictional scope, a triggering condition, and a compliance requirement; (c) associating, by the one or more processors, each machine-interpretable obligation object with one or more predefined data element categories representing classes of information regulated by the obligation clause; (d) generating, by the one or more processors, an obligation graph data structure comprising: nodes representing entities, data element categories, obligation objects, and incidents, and edges representing legally relevant relationships including custody, control, exposure, jurisdictional applicability, or statutory linkage; (e) propagating, by the one or more processors, the machine-interpretable obligation objects through the obligation graph data structure based on the edges to determine compliance obligations applicable to a given entity and incident, including propagation across third-party or fourth-party relationships; (f) determining, by the one or more processors and using the propagated machine-interpretable obligation objects, legally constrained compliance actions required of the given entity, wherein the determining is performed without requiring access to record-level data associated with the incident and instead relies on metadata describing affected data element categories; and (g) generating, by the one or more processors, a compliance output comprising jurisdiction-specific legally sufficient instructions, notices, or reports corresponding to the determined compliance actions.

In accordance with yet another aspect of the present invention, a computer-implemented compliance determination system comprises one or more processors and one or more non-transitory computer-readable storage media storing instructions that, when executed by the one or more processors, cause the system to: (a) execute an extraction agent configured to ingest statutory and regulatory source text from a plurality of jurisdictions and extract clause-level legally operative obligation clauses as machine-interpretable obligation objects; (b) execute a validation agent configured to verify the extracted obligation objects by comparison against at least one secondary statutory source, prior statutory version, or predefined validation rule set; (c) execute a synthesis agent configured to assemble validated obligation objects into compliance outputs constrained by jurisdiction-specific legal requirements; (d) maintain a shared obligation repository comprising versioned obligation objects accessible to the extraction agent, validation agent, and synthesis agent; (e) generate, using the synthesis agent, legally constrained compliance outputs for a given entity and incident by propagating the validated obligation objects across relationships representing custody, control, or jurisdictional applicability; and (f) record, in an audit log, agent actions, obligation object versions, and propagation paths sufficient to reconstruct generation of the compliance outputs.

In accordance with still another aspect of the present invention, a non-transitory computer-readable storage medium stores instructions that, when executed by one or more processors, cause the one or more processors to perform operations comprising: (a) ingesting statutory and regulatory source text from a plurality of jurisdictions; (b) parsing the statutory and regulatory source text at a clause level to generate machine-interpretable obligation objects comprising jurisdictional scope, triggering conditions, and compliance requirements; (c) associating the obligation objects with predefined data element categories representing regulated classes of information; (d) propagating the obligation objects across relationships representing entity custody, control, exposure, or jurisdictional applicability to determine compliance obligations applicable to an incident; (e) determining legally constrained compliance actions without accessing record-level data associated with the incident and instead relying on metadata describing affected data element categories; and (f) generating jurisdiction-specific compliance outputs corresponding to the determined compliance actions.

In some embodiments, the system is configured to initiate a compliance timing workflow upon detection of an incident indicator event, such as suspicious activity, anomalous access, unauthorized exfiltration indicators, ransomware execution, compromise alerts, or other cybersecurity events that may reasonably indicate unauthorized acquisition or access to regulated information. In such embodiments, the system records an incident indicator timestamp representing the earliest known time at which the controller or processor became aware of suspicious activity or an event suggestive of unauthorized access, and uses the incident indicator timestamp as a reference point for calculating legally constrained compliance deadlines.

In some embodiments, the system generates a notice timing matrix comprising jurisdiction-specific deadline requirements calculated from the incident indicator timestamp and/or a discovery timestamp, and outputs a countdown timeline representing remaining time to satisfy statutory notice requirements. In some embodiments, the system generates a delay risk score based on a comparison of calculated statutory deadlines to the completeness of available incident metadata, availability of affected data element categorization, status of forensic investigation, and/or unresolved uncertainty indicators. The delay risk score may be used to trigger escalation actions, including generation of provisional compliance outputs.

In some embodiments, the system is configured to generate interim regulator-facing status update communications when a legally required notice output cannot yet be finalized due to incomplete information, ongoing forensic investigation, or uncertainty as to affected individuals or affected data element categories. Such interim regulator-facing status updates may include incident summary information, identified jurisdictions, preliminary affected data element categories, investigative status, known remediation actions, and an expected timeline for issuance of final notice outputs.

In some embodiments, the audit log and/or evidence object records the incident indicator timestamp, discovery timestamp, statutory deadline calculations, delay risk score values, interim regulator-facing outputs, and subsequent finalized notice outputs, thereby enabling evidentiary reconstruction of compliance diligence and timing decisions.

In some embodiments, the system prioritizes compliance actions associated with jurisdictions requiring notification within a fixed period after discovery and/or without unreasonable delay.

BRIEF DESCRIPTION OF THE DRAWINGS

These and other objects and aspects of the present invention will be described with reference to the following drawing figures, of which:

FIG. 1 is a diagram illustrating a compliance determination system in accordance with an exemplary embodiment of the present invention;

FIG. 9 is a diagram illustrating a computer-implemented compliance determination system in accordance with an exemplary embodiment of the present invention;

FIG. 10 is a flow diagram of a computer-implemented method in accordance with an exemplary embodiment of the present invention.

DETAILED DESCRIPTION

Figure 2:
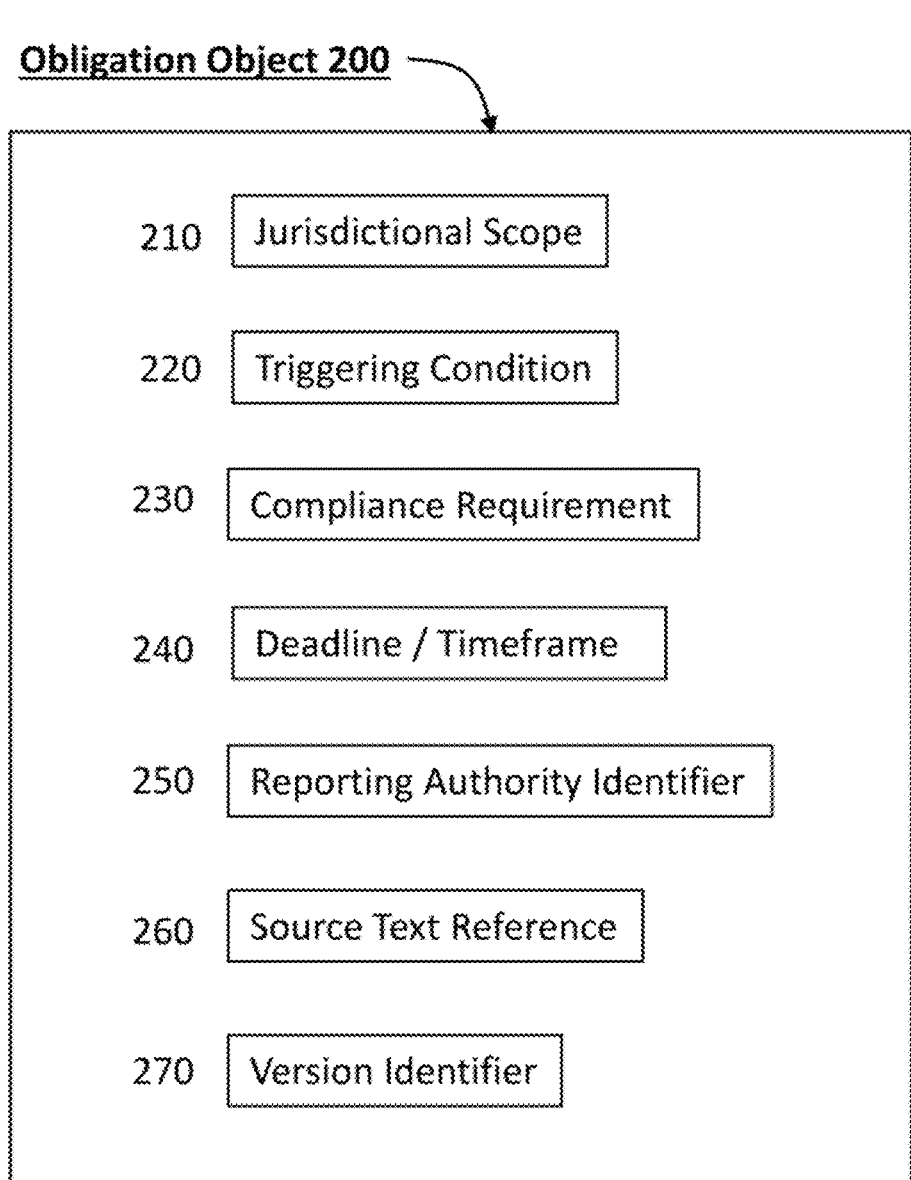
FIG. 2 is a diagram illustrating an obligation object structure in accordance with an exemplary embodiment of the present invention.

With reference to FIG. 1, the compliance determination system 100 in accordance with the present invention provides systems and methods that ingest statutory and regulatory source text from multiple jurisdictions at module 110. The system then parses the source text at a clause level to identify legally operative obligations at module 120. The machine-interpretable obligation objects representing compliance duties are extracted and stored in repository 130. Obligations are associated with regulated data element categories, model entities, incidents, data elements in obligation graph engine 140. Obligations are propagated across legally relevant relationships, including third- and fourth-party relationships, in propagation and conflict-resolution engine 150. Legally constrained compliance actions are determined without accessing record-level data, relying instead on metadata proxies, in metadata-based compliance determination engine 160. Jurisdiction-specific, legally sufficient compliance outputs, supported by auditability and reconstruction, are generated in compliance output generator 170. The system 100 may provide information to audit and reconstruction log 180, and 2-way communications may be effected between the generator 170 and external systems and users 190.

The invention is not limited to breach notification and applies broadly to compliance obligations including notification, remediation, documentation, reporting, and governance actions.

In an exemplary embodiment, the statutory and regulatory ingestion module 110 ingests statutory and regulatory source text from a plurality of jurisdictions, including but not limited to federal, state, provincial, national, and international sources. The source text may be obtained from official legislative or regulatory publications, regulatory guidance documents, administrative rules, amendments, updates, or revisions thereof. The ingestion process may include normalization, versioning, and storage of statutory text to support subsequent parsing and change detection.

Unlike systems that treat statutes as monolithic documents, the clause-level parsing and obligation object extraction module 120 parses statutory and regulatory source text at a clause level to identify legally operative obligation clauses. An obligation clause may be identified based on mandatory or conditional statutory language, triggering conditions (e.g., "if," "when," "in the event of"), defined thresholds (e.g., number of affected individuals), and/or enforcement or penalty provisions. Each identified obligation clause is extracted as a machine-interpretable obligation object. In various embodiments, and as shown in FIG. 2, an obligation object comprises a jurisdictional scope 210; one or more triggering conditions 220; one or more compliance requirements 230; associated deadlines or timeframes 240; applicable reporting authorities 250; and references to source text 260 and version identifiers 270.

Obligation objects persist independently of any specific incident and may be stored in repository 130 and reused across multiple determinations.

Data element categorization is performed in obligation graph engine 140. Each obligation object is associated with one or more predefined data element categories representing classes of regulated information, such as personal identifiers, financial data, health data, authentication data, or other legally regulated data types. In some embodiments, the data element categories are defined as atomic data element classes, enabling fine-grained mapping between legal obligations and technical data inventories. This association enables the system to determine applicability of obligations based on metadata describing affected data categories, rather than record-level content.

Figure 3:
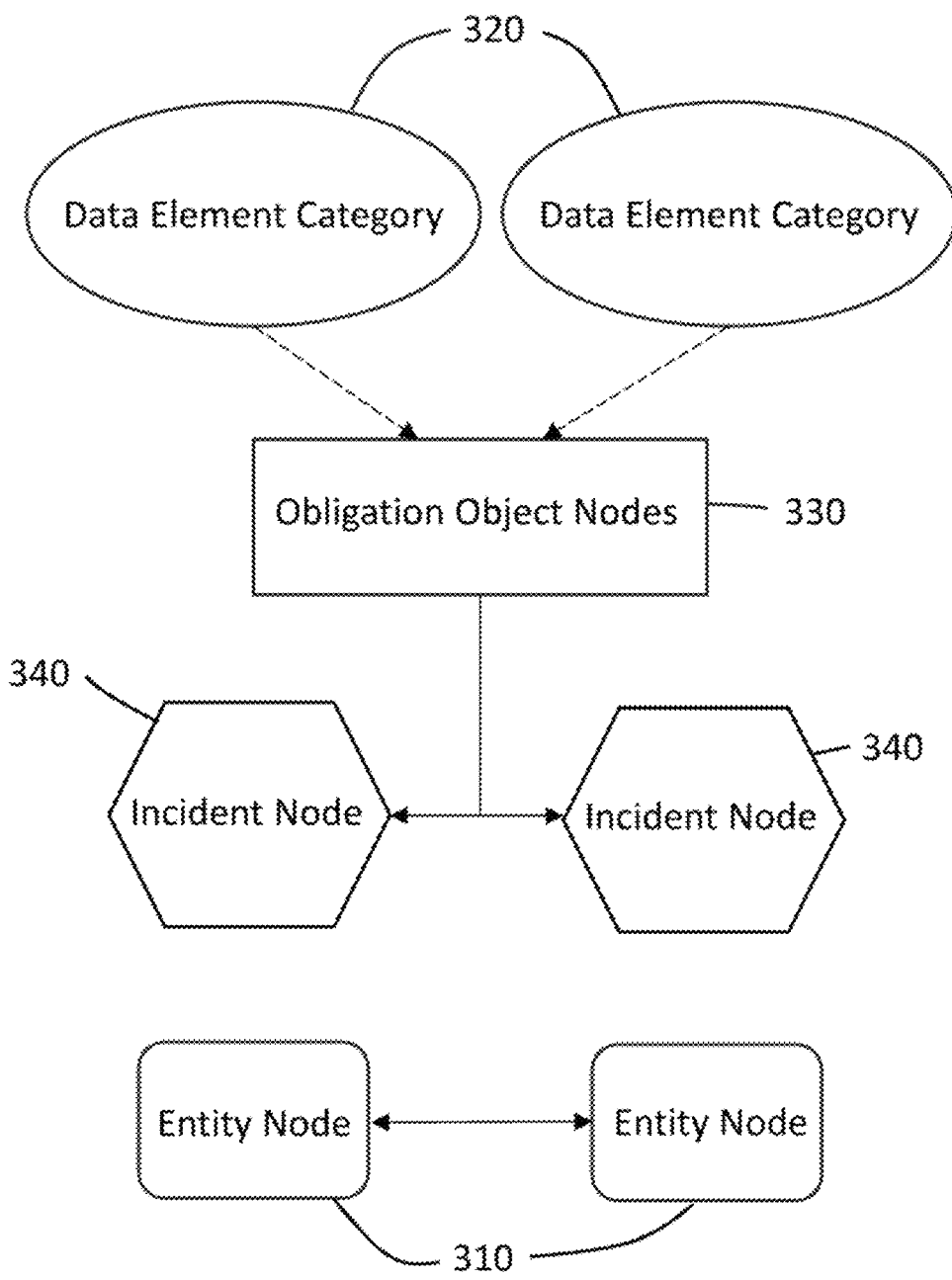
FIG. 3 is a diagram illustrating an obligation data structure in accordance with an exemplary embodiment of the present invention.

The engine 140 generates and maintains an obligation graph data structure comprising nodes and edges, as shown in FIG. 3. Node types may include entity nodes 310 (e.g., organizations, service providers), data element category nodes 320, obligation object nodes 330, and incident nodes 340. Edge types may represent custody or control relationships, exposure or access relationships, jurisdictional applicability, contractual responsibility, and statutory linkage. Edges may be weighted, directional, temporal, or conditional. The obligation graph enables structured propagation of legal obligations across complex entity and data relationships.

Figure 4:
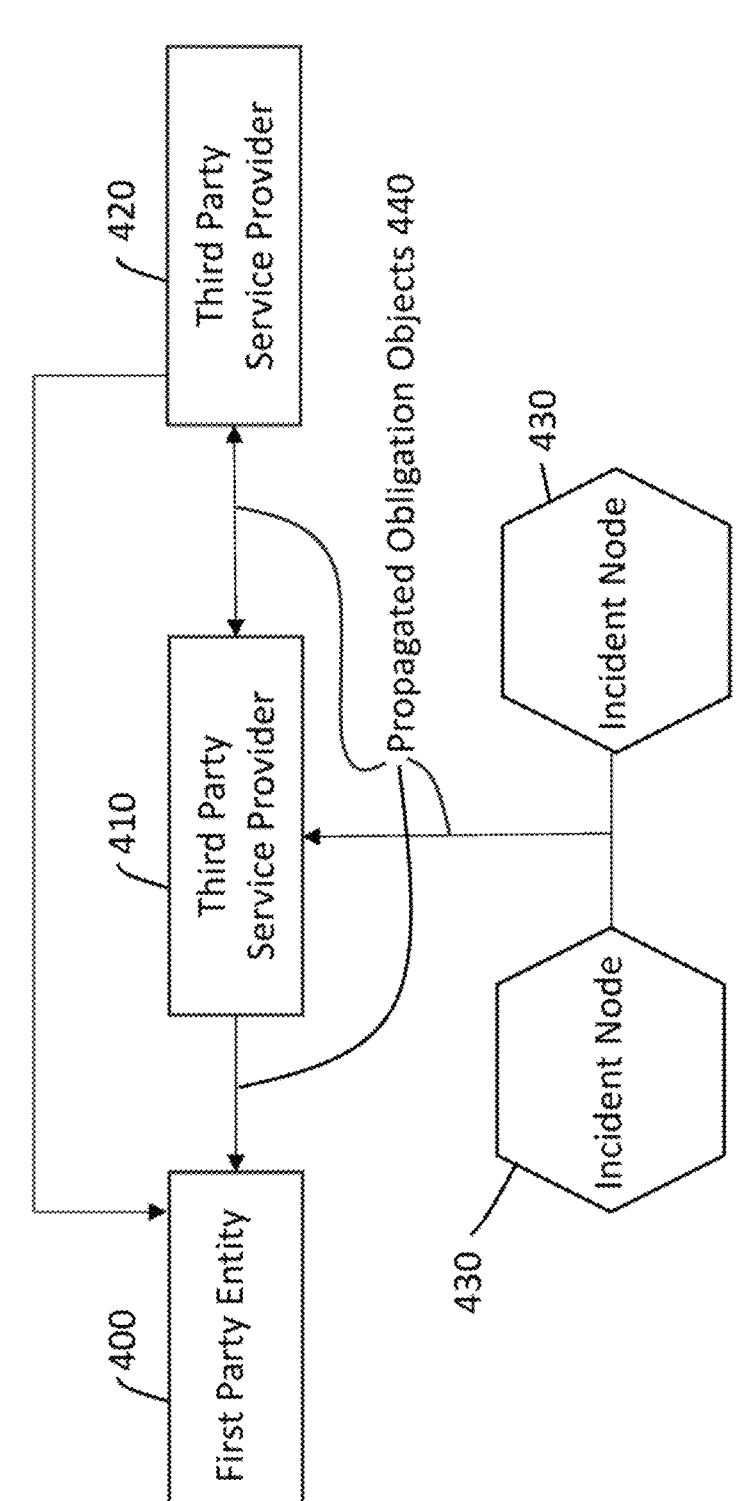
FIG. 4 is a diagram illustrating obligation propagation across entities in accordance with an exemplary embodiment of the present invention.

Obligation propagation across entities and incidents is effected in propagation and conflict-resolution engine 150, FIG. 1, and shown in more detail in FIG. 4. Upon identification of an incident, such as a cybersecurity event or loss-of-control event, relevant obligation objects 440 are propagated from incident nodes 430 through the obligation graph to parties 400, 410, 420 to determine compliance obligations applicable to a given entity. Propagation may include inheritance of obligations from third-party or fourth-party incidents; suppression of inapplicable obligations based on jurisdictional or temporal constraints; conflict resolution among overlapping obligations. This propagation allows the system to compute compliance obligations that arise indirectly, such as when a service provider experiences an incident affecting client data.

Figure 5:
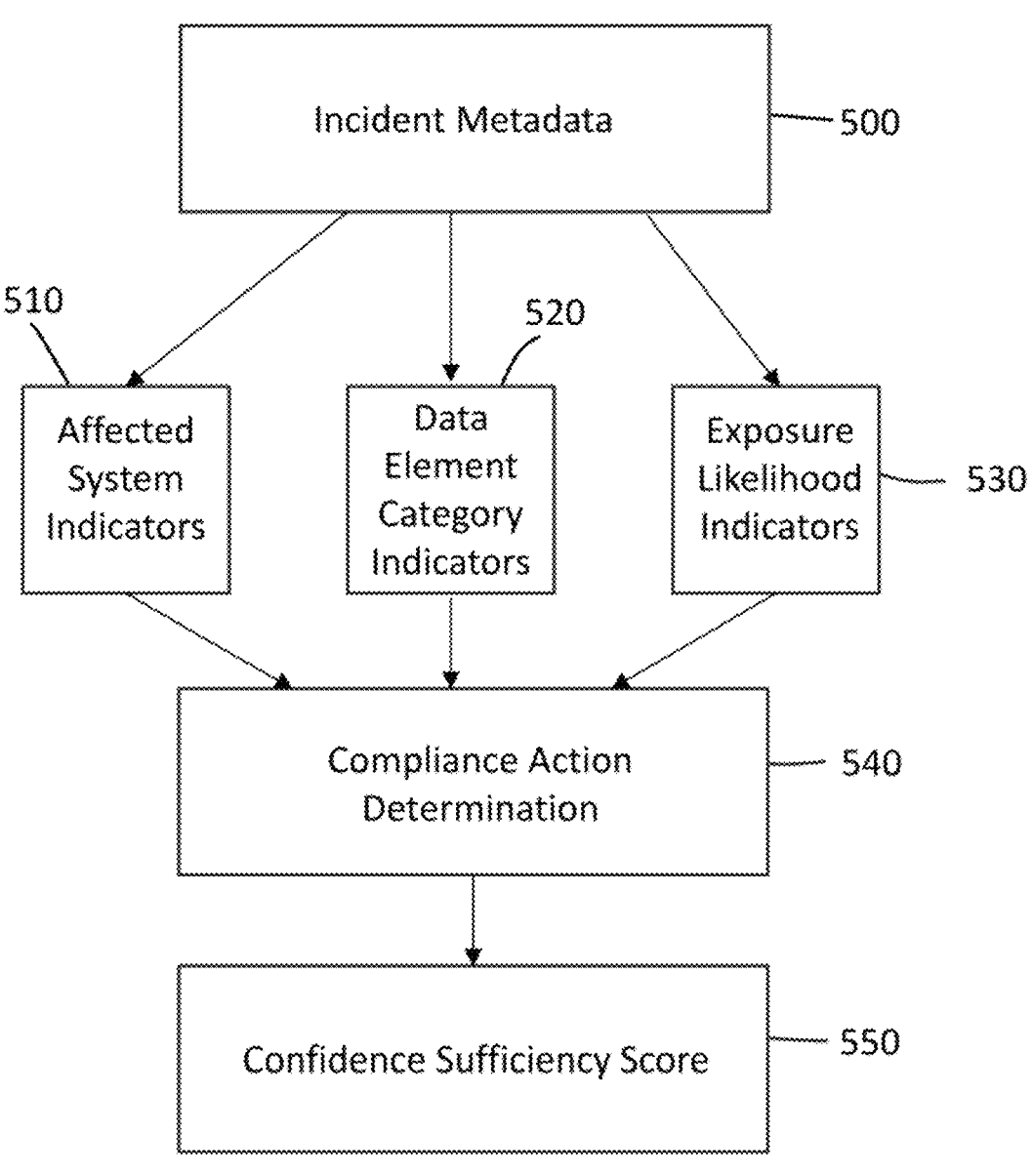
FIG. 5 is a diagram illustrating metadata-only compliance determination in accordance with an exemplary embodiment of the present invention.

Metadata-based compliance, determined in engine 160 without record-level data, is shown in more detail in FIG. 5. A key aspect of the invention is the ability to determine legally constrained compliance actions without requiring access to record-level data. Instead, the system relies on incident metadata 500 describing affected data element categories 520; system or application impact 510; exposure likelihood 530; and entity relationships. This enables compliance determination 540 under conditions where data is encrypted or unavailable due to ransomware, third-party systems restrict access, and/or forensic investigation is incomplete. The system may assign confidence or sufficiency scores 550 to determinations and generate provisional outputs when data is incomplete.

Figure 8:
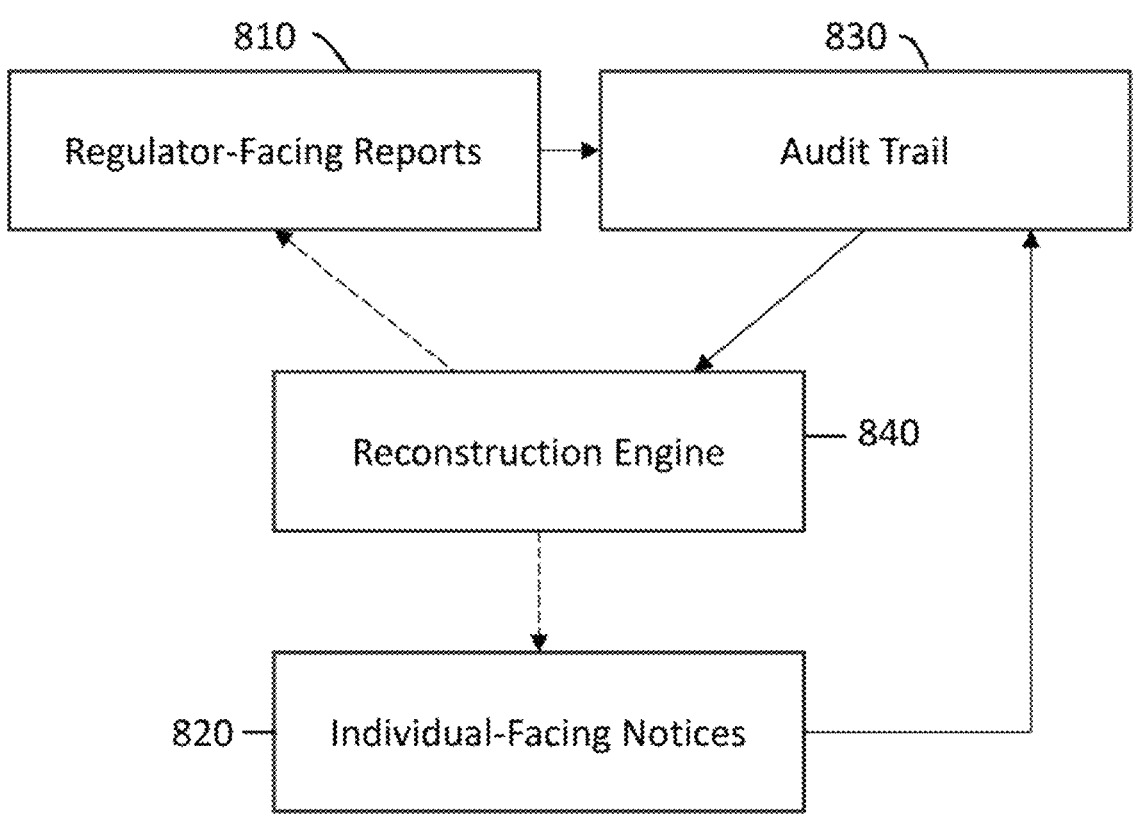
FIG. 8 is a diagram illustrating compliance output and audit reconstruction in accordance with an exemplary embodiment of the present invention.

As shown in FIG. 8, based on propagated obligation objects from audit trail 830, a reconstruction engine 840, in compliance output generator 170, FIG. 1, generates compliance outputs including regulator-facing reports 810, individual facing notices 820, internal compliance instructions, and timelines and milestones. Outputs may differ based on audience, such as regulator-facing versus individual-facing notices, while preserving legal sufficiency.

Figure 6:
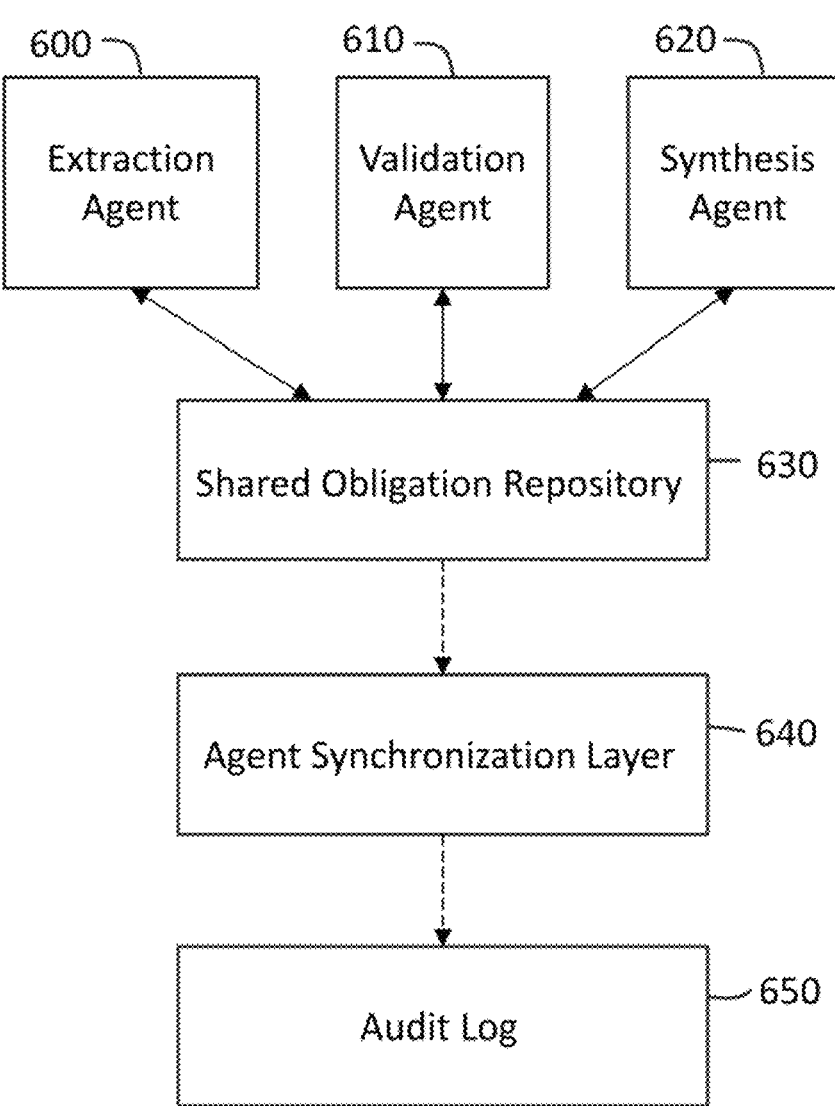
FIG. 6 is a diagram illustrating an agent-based architecture in accordance with an exemplary embodiment of the present invention.

The present invention may optionally employ an agent-based architecture, as shown in FIG. 6. For example, the system may employ a plurality of specialized software agents, including extraction agents 600, validation agents 610, and synthesis agents 620. These agents may operate asynchronously and synchronize obligation objects through a shared, version-controlled repository 630. The validation agent may verify obligation objects using cross-source comparison, version analysis, or rule-based checks, and the repository 630 may provide such information to agent synchronization layer 640, which in turn provides an input to audit log 650, which captures ingested statutory sources, obligation object versions, propagation paths, and generated outputs. These logs enable reconstruction of compliance determinations for regulatory review, litigation defense, or internal governance.

Figure 7:
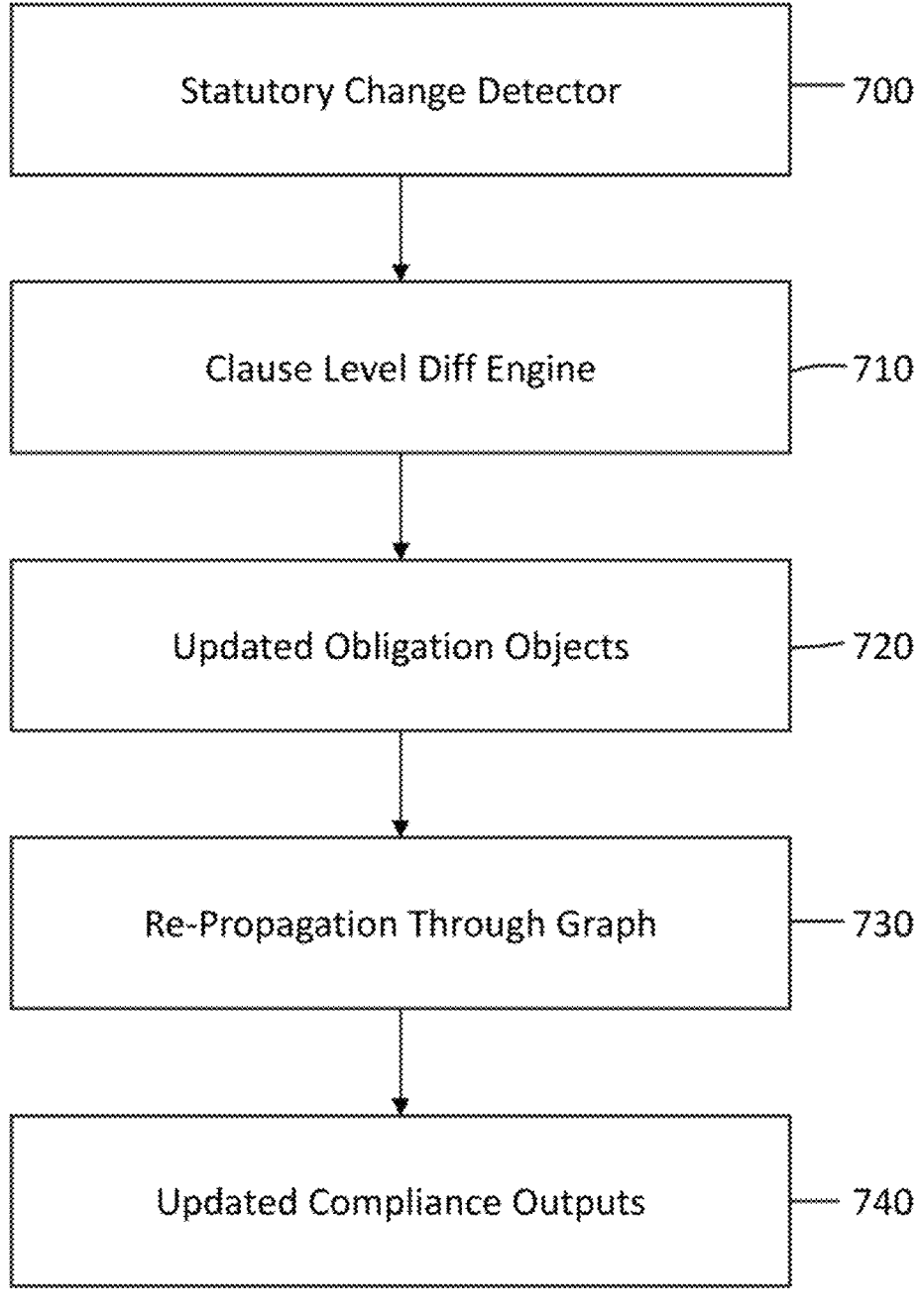
FIG. 7 is a diagram illustrating change detection and re-computation in accordance with an exemplary embodiment of the present invention.

The present invention may continuously monitor statutory and regulatory source text for changes and re-computation. As shown in FIG. 7, upon detection of a change in statutory change detector 700, affected obligation objects are updated in clause level difference engine 710, to produce updated obligation objects 720, which are propagated in 730 to recompute compliance obligations and outputs 740.

FIG. 9 illustrates an exemplary block diagram of a computer-implemented compliance determination system 900 in accordance with one embodiment of the present invention. The system 900 includes a statutory and regulatory ingestion module 910 configured to ingest statutory and regulatory source text 905 from a plurality of jurisdictions. The statutory and regulatory ingestion module 910 is communicatively coupled to a clause-level parsing and obligation extraction module 920, which is configured to parse the ingested source text at a clause level and extract legally operative obligation clauses as machine-interpretable obligation objects The extracted machine-interpretable obligation objects, examples of which are discussed in connection FIG. 2, are stored in or accessed from an obligation object repository 930, and are associated with one or more predefined data element categories representing classes of regulated information.

The system 900 further includes an obligation graph engine 940, an example of which is shown in FIG. 3, configured to generate and maintain an obligation graph data structure comprising nodes representing entities, data element categories, obligation objects, and incidents, and edges representing legally relevant relationships including custody, control, exposure, jurisdictional applicability, or statutory linkage.

An obligation propagation engine 950, an example of which is shown in FIG. 4, is configured to propagate the machine-interpretable obligation objects through the obligation graph data structure based on the edges to determine compliance obligations applicable to a given entity and incident, including propagation across third-party or fourth-party relationships.

The system 900 further includes a metadata-based compliance determination engine 960, an example of which is shown in FIG. 5, configured to determine legally constrained compliance actions required of the given entity using the propagated obligation objects, wherein the determination is performed without requiring access to record-level data associated with the incident and instead relies on metadata describing affected data element categories.

A compliance output generator 970, an example of which is shown in FIG. 8, is configured to generate jurisdiction-specific legally sufficient compliance outputs comprising instructions, notices, or reports corresponding to the determined compliance actions.

In some embodiments, the system 900 may further include an audit and reconstruction log 980 configured to record ingestion events, obligation object versions, propagation paths, and generated compliance outputs to support reconstruction of compliance determinations.

FIG. 10 illustrates an exemplary flow diagram of compliance determination process flow 1000 for determining legally constrained compliance obligations. At step 1010, statutory and regulatory source text is ingested from a plurality of jurisdictions. At step 1020, the ingested statutory and regulatory source text is parsed at a clause level to identify legally operative obligation clauses, and each identified obligation clause is extracted as a machine-interpretable obligation object comprising at least a jurisdictional scope, a triggering condition, and a compliance requirement. At step 1030, each machine-interpretable obligation object, examples of which are shown in FIG. 2, is associated with one or more predefined data element categories representing classes of information regulated by the obligation clause.

At step 1040, an obligation graph data structure, an example of which is shown in FIG. 3, is generated, the obligation graph data structure comprising nodes representing entities, data element categories, obligation objects, and incidents, and edges representing legally relevant relationships including custody, control, exposure, jurisdictional applicability, or statutory linkage.

At step 1050, the machine-interpretable obligation objects are propagated through the obligation graph data structure based on the edges, as shown, for example in FIG. 4, to determine compliance obligations applicable to a given entity and incident, including propagation across third-party or fourth-party relationships.

At step 1060, legally constrained compliance actions required of the given entity are determined using the propagated machine-interpretable obligation objects, wherein the determination is performed without requiring access to record-level data associated with the incident and instead relies on metadata describing affected data element categories.

At step 1070, a compliance output is generated comprising jurisdiction-specific legally sufficient instructions, notices, or reports corresponding to the determined compliance actions, as shown in FIG. 8, for example.

In some embodiments, the system is configured to continuously or periodically monitor statutory and regulatory source text for changes using an automated detection process. Upon detection of a statutory or regulatory amendment, addition, or repeal, the system performs clause-level analysis to identify affected obligation clauses and updates corresponding machine-interpretable obligation objects.

In conjunction with obligation object updates, the system synchronizes one or more predefined data element taxonomies, including a National Breach-Trigger Data Element taxonomy (NBTC v3), to reflect changes in legally regulated data elements, definitions, or thresholds. Updated taxonomy elements are versioned and associated with effective dates, enabling subsequent compliance determinations to reflect the current legal landscape at the time of evaluation.

Illustrative Embodiment 1

Pre-Breach Compliance Preparation with Purview Scan, NBTC v3 Synchronization, and Anonymized Re-Identifiable Identifiers.

This embodiment, supported by the structure and process described with reference to FIGS. 1, 2, 3, and 7, illustrates pre-incident operation of the compliance determination system to establish a legally current, privacy-preserving compliance readiness baseline using a Microsoft Purview data discovery scan, combined with real-time statutory and regulatory monitoring and synchronization of a National Breach-Trigger Data Element taxonomy (NBTC v3).

Step 1—Pre-Breach Data Discovery and Metadata Generation (FIG. 1; FIG. 2). Prior to any cybersecurity incident, an entity initiates a data discovery scan using a data governance platform, such as Microsoft Purview, across information systems operated by the entity and by third-party service providers, including managed service providers (MSPs) and managed security service providers (MSSPs).

The Purview scan identifies and tags, at a metadata level: data element categories (e.g., PHI, PII, financial data); system locations and custodial environments; access and processing relationships; and sensitivity classifications.

Direct identifiers, including names and addresses, are processed through an anonymization process in which identifiers are transformed into hashed values, such that: the resulting dataset contains no plaintext personal identifiers; the hash sets are stored securely and separately, and controlled re-identification remains technically possible if legally required.

The output of the scan is an ingest-ready, metadata-only dataset suitable for compliance computation without exposure of raw personal data.

Step 2—Statutory and Regulatory Monitoring and NBTC v3 Synchronization (FIG. 1; FIG. 7). Concurrently with ingestion of the Purview output, the system monitors statutory and regulatory source text across applicable jurisdictions using an automated detection process that may include AI-enhanced text comparison, clause-level diffing, or rule-based analysis.

Upon detection of a statutory or regulatory update affecting breach triggers, definitions, thresholds, or notification requirements, the system: updates affected machine-interpretable obligation objects; and synchronizes the NBTC v3 taxonomy to reflect the current legally regulated data element definitions applicable at the time of evaluation. Each taxonomy update is versioned and associated with an effective date, enabling subsequent determinations to be anchored to the legally current state of the law.

Step 3—Ingestion into the Compliance Determination System (FIG. 1—Modules 110, 120; FIG. 2). The anonymized Purview metadata output is ingested into the compliance determination system and associated with: predefined data element categories aligned to the current NBTC v3 taxonomy; entity and vendor relationship metadata, and jurisdictional scope. Because the taxonomy is synchronized prior to ingestion, the system ensures that all subsequent compliance readiness analysis reflects current statutory and regulatory requirements, not stale or static assumptions.

Step 4—Pre-Incident Obligation Graph Construction and Risk Assessment (FIG. 3). The system generates an obligation graph comprising: entity nodes for the organization, MSPs, and MSSPs; data element category nodes mapped to NBTC v3; obligation object nodes reflecting current legal requirements; and relationship edges representing custody, control, access, and jurisdictional applicability.

Using this graph, the system computes a pre-breach compliance posture, including: estimated notification exposure by jurisdiction; potential regulatory reporting obligations; and compliance readiness timelines. Because identifiers remain anonymized, this assessment can be performed without increasing privacy risk, while remaining re-identifiable if necessary during a future incident.

Resulting Pre-Breach Outputs include: a compliance readiness dashboard; jurisdiction-specific notification scenarios; an auditable snapshot of the NBTC v3 version applied; and a timestamped baseline for future comparison.

Illustrative Embodiment 2

Post-Incident Compliance Determination Using Pre-Existing Purview Baseline and NBTC v3 Currency Verification.

This embodiment, supported by the structure and process described with reference to FIGS. 1, 3, 4, 5, and 7, illustrates post-incident operation following a cybersecurity event, in which a previously generated Purview scan and anonymized baseline is used to determine legally constrained compliance obligations by comparison against live data, restored backups, or dark-net datasets, while ensuring that all determinations reflect the current version of the NBTC v3 taxonomy and applicable law at the time of evaluation.

Step 1—Cybersecurity Incident and Incident Node Activation (FIG. 4). A cybersecurity incident occurs affecting systems operated by a third-party service provider, such as an MSSP or MSP. The incident may involve ransomware, data exfiltration, or loss of system availability. An incident node is activated in the obligation graph, even though the entity may lack immediate access to complete record-level data.

Step 2—Post-Incident Data Source Ingestion (FIG. 5). The system ingests one or more post-incident datasets, which may include: live system metadata (if available); restored backup datasets; or datasets obtained from dark-net monitoring or threat-intelligence services. These datasets may include full records, partial records, or hashed identifiers only.

Step 3—NBTC v3 Currency Verification and Update (FIG. 7). Before performing compliance determination, the system verifies that: the NBTC v3 taxonomy reflects the most recent statutory and regulatory updates applicable to the affected jurisdictions, and the obligation objects used for propagation correspond to the current legal definitions and thresholds. If changes have occurred since the pre-breach Purview scan, the system updates the taxonomy and obligation objects and records the version applied for auditability.

Step 4—Comparison Against Pre-Breach Purview Baseline (FIGS. 3 and 5). Using anonymized but re-identifiable hash sets, the system compares post-incident datasets against the pre-existing Purview baseline to determine: which data element categories are implicated, which hashed identifiers appear in post-incident datasets, and the estimated scope of affected individuals. This comparison can be performed without exposing plaintext names or addresses unless re-identification is legally required.

Step 5—Obligation Propagation and Compliance Determination (FIGS. 3 and 4). The system propagates obligation objects through the obligation graph: from the incident node, across vendor and contractual responsibility edges, across data element categories aligned to NBTC v3, and across jurisdictional applicability edges. Legally constrained compliance actions are determined using metadata-only analysis, even when forensic investigation remains incomplete.

Step 6—Compliance Output Generation and Audit Logging (FIG. 1; FIG. 5). The system generates: regulator-ready reports, jurisdiction-specific notification outputs, compliance timelines and deadlines, and evidentiary documentation. Audit logs record: the pre-breach baseline, the post-incident comparison logic, the NBTC v3 version applied, and all assumptions used.

Together, these embodiments now explicitly demonstrate temporal currency of legal analysis, real-time statutory and regulatory synchronization, operational use of NBTC v3 as a living taxonomy, privacy-preserving but defensible workflows, and pre- and post-incident continuity.

Notice Assembly Engine (NAE) and Determination Bundle Rendering

In some embodiments, the compliance output generator 170 (FIG. 1) includes a Notice Assembly Engine ("NAE") configured to generate structured notification artifacts from a determination bundle derived from propagated obligation objects. The NAE may operate as a submodule of the compliance output generator 170, or as a separate module communicatively coupled to the obligation repository 130, obligation graph engine 140, and audit and reconstruction log 180.

As used herein, a "determination bundle" refers to a structured data object comprising the output of the obligation propagation and compliance determination processes, including but not limited to: applicable jurisdictions; applicable obligation objects; notification deadlines; reporting authority identifiers; required notice content elements; incident attributes; affected data element categories; estimated affected individual counts; exposure likelihood indicators; entity and vendor relationship attributes; and confidence or sufficiency scores. The determination bundle may include both mandatory and optional content fields required by applicable statutes or regulations.

In an exemplary embodiment, the determination bundle is generated by the propagation and conflict-resolution engine 150 and/or metadata-based compliance determination engine 160, and provided as input to the NAE for generation of one or more notification artifacts.

Template Fragment Repository and Dynamic Rendering—In some embodiments, the NAE is configured to generate notification outputs by dynamically assembling notification text from modular template fragments rather than selecting a single static template. The modular template fragments may be stored in a template fragment repository comprising jurisdiction-specific text segments, clause-derived required content fields, regulator-specific submission instructions, and formatting requirements.

Each template fragment may be associated with one or more metadata tags, including jurisdiction identifiers, data element category identifiers, industry sector identifiers, delivery method identifiers, reporting authority identifiers, and trigger conditions. In operation, the NAE selects and assembles template fragments based on the determination bundle parameters to generate a customized notification output.

For example, a first jurisdiction may require inclusion of a toll-free number, credit monitoring information, a description of the incident, and the categories of information affected. The NAE may assemble these requirements into a structured notification draft using fragments tagged to the relevant jurisdiction and incident parameters. In another example, the same jurisdiction may require different disclosure language depending on whether the affected data element categories include Social Security numbers, driver's license numbers, medical information, biometric identifiers, or authentication credentials. Accordingly, the NAE may assemble different notification text segments based on the affected data element categories identified in the determination bundle.

Placeholder-Based Privacy-Preserving Draft Generation—In some embodiments, the NAE generates notification artifacts using privacy-preserving placeholders rather than record-level personal information. For example, the NAE may generate a consumer notice draft containing placeholder fields such as: [ENTITY_NAME]; [INCIDENT_DATE_RANGE]; [DATA_ELEMENT_CATEGORIES_AFFECTED]; [AFFECTED_INDIVIDUAL_COUNT_ESTIMATE]; [REGULATOR_REPORTING_DEADLINE]; [REPORTING_AUTHORITY_NAME]; [CONTACT_INFORMATION]; [CREDIT_MONITORING_OFFER_DETAILS].

Such placeholder fields may be populated by the entity's counsel or incident response team after review. In some embodiments, the placeholder values are populated automatically only after a privilege-aware authorization step or re-identification event.

In some embodiments, the NAE generates a "PII-free notice draft" configured to be safely shared with third-party vendors, insurers, or external counsel without disclosing record-level personal information.

Notice Evidence Object (NEO) and Audit Linkage—In some embodiments, the NAE generates a Notice Evidence Object ("NEO") comprising a structured evidentiary record sufficient to support reconstruction of the notice generation process. The NEO may include: (a) a list of obligation objects used in generating the notice, including version identifiers and statutory source references; (b) a list of template fragments used, including fragment identifiers and version identifiers; (c) a listing of required content fields included in the notice and their statutory or regulatory basis; (d) a deadline matrix identifying notification deadlines, regulator reporting deadlines, and any applicable delay provisions; (e) a list of assumptions or inferred parameters used due to incomplete metadata; (f) confidence or sufficiency scores assigned to the generated outputs; (g) an output hash value representing the generated notice artifact;

and (h) a timestamped audit record identifying the time of generation and the system state.

In some embodiments, the NEO is recorded in the audit and reconstruction log 180 (FIG. 1) to support regulatory inquiry, litigation defense, cyber insurance coverage disputes, or internal compliance review. The NEO may be cryptographically signed or timestamped using a trusted timestamping service to create an immutable compliance record.

Notice Package Generation—In some embodiments, the NAE generates a Notice Package comprising one or more jurisdiction-specific notification artifacts bundled together with structured compliance instructions. The Notice Package may include, without limitation: a consumer-facing notice draft for each applicable jurisdiction; a regulator-facing report draft for each applicable jurisdiction; a submission instruction sheet identifying filing portals, mailing addresses, email addresses, or electronic reporting methods; a deadline and milestone calendar; a required content checklist; and the Notice Evidence Object.

In some embodiments, the Notice Package is exported in both human-readable formats (e.g., PDF or word-processing document format) and machine-readable formats (e.g., JSON or XML) suitable for ingestion by external governance, risk, incident response, or document management systems.

Jurisdiction-Specific Variation Based on Incident Parameters—In some embodiments, the NAE is configured to generate different notice content for the same jurisdiction depending on incident-specific parameters contained in the determination bundle. For example, the NAE may generate different recommended content when the affected data element categories include authentication credentials as opposed to financial account numbers. Similarly, the NAE may generate different language depending on whether the incident involves encryption, exfiltration, mere access, or a loss-of-control event, and may generate different recommended remediation instructions based on the type of exposure.

Accordingly, the NAE is not limited to selecting from static templates but instead generates dynamic notice artifacts derived from machine-interpretable obligation objects and incident metadata.

Human Review and Approval Workflow—In some embodiments, the NAE is configured to require human review and approval prior to final issuance of a notice. A human reviewer, such as legal counsel, may modify generated notice content, insert entity-specific information, and approve issuance. Modifications made by the human reviewer may be recorded in the audit log and associated with the Notice Evidence Object. In some embodiments, the system distinguishes between draft outputs intended for internal use and final outputs intended for external distribution.

Integration with Determination Bundle Pipeline—In an exemplary embodiment, the system executes a pipeline comprising: (a) generating a determination bundle based on propagated obligation objects and metadata-only compliance determination; (b) loading a set of jurisdiction-specific template fragments and required content fields; (c) rendering a draft notice output using placeholders and structured content requirements; (d) generating a deadline matrix and compliance milestone schedule; (e) generating a Notice Evidence Object comprising evidentiary linkage to obligation objects, statutory sources, and version identifiers; and (f) bundling the foregoing into a Notice Package for delivery to an entity, counsel, or incident response team.

The foregoing pipeline enables the system to generate legally constrained, jurisdiction-specific notification artifacts and compliance playbooks while maintaining privacy-preserving operation and auditability. The present invention may be deployed as a standalone system, a distributed system, or a multi-tenant compliance service platform. Logical separation of obligation graphs and metadata may be maintained across tenants.

Thus, the disclosed systems and methods provide a technical solution to the problem of computing legal compliance obligations under uncertainty, using machine-interpretable obligation objects, graph-based propagation, metadata-only inference, and legally constrained output generation. The preset invention effectively addresses technical gaps that the prior art fails to provide, namely systems that extract clause-level legal obligations as machine-interpretable objects, maintain obligations independently of incidents, propagate obligations across graph-modeled entity and data relationships, determine legally constrained compliance actions without record-level data, support continuous statutory change detection and recomputation; and generate auditable, reconstructable compliance outputs. The present invention addresses these deficiencies through a novel combination of obligation object modeling, graph-based propagation, metadata-only inference, and legally constrained output generation.

While the foregoing is directed to exemplary embodiments of the present invention, other and further embodiments of the invention may be devised without departing from the basic scope thereof. The examples disclosed herein are for exemplary purposes only and should not be construed as limiting the present invention, which is defined in the following claims.

I claim:

1. A computer-implemented system comprising:
one or more processors and one or more non-transitory computer-readable storage media storing instructions that, when executed by the one or more processors, cause the system to:
(a) ingest statutory and regulatory source text from a plurality of jurisdictions;
(b) parse the ingested statutory and regulatory source text at a clause level to identify legally operative obligation clauses, wherein each obligation clause is extracted as a machine-interpretable obligation object comprising at least a jurisdictional scope, a triggering condition, and a compliance requirement;
(c) associate each machine-interpretable obligation object with one or more predefined data element categories representing classes of information regulated by the obligation clause;
(d) generate and maintain an obligation graph data structure comprising: (i) nodes representing entities, data element categories, obligation objects, and incidents, and (ii) edges representing legally relevant relationships including custody, control, exposure, jurisdictional applicability, or statutory linkage;
(e) propagate the machine-interpretable obligation objects through the obligation graph data structure based on the edges to determine compliance obligations applicable to a given entity and incident, including propagation across third-party or fourth-party relationships;
(f) determine, using the propagated machine-interpretable obligation objects, legally constrained compliance actions required of the given entity, wherein the system comprises a predefined, machine-interpretable data structure comprising metadata describing data element categories and obligation objects, upon which the obligation graph data structure is generated and operated, wherein the system is constrained to operate on the data structure rather than on underlying record-level data, and wherein the determination is performed without requiring direct access to record-level data associated with the incident and instead relies on metadata describing affected data element categories, wherein the metadata is ingested from a data governance platform configured to perform enterprise discovery, classification, and labeling of data; and
(g) generate a compliance output comprising jurisdiction-specific legally sufficient instructions, notices, or reports corresponding to the determined compliance actions, wherein the compliance output is generated by performing a deterministic transformation of the data structure.

2. The system of claim 1, wherein the machine-interpretable obligation object further comprises at least one of: a notification deadline, a reporting authority identifier, a notice content requirement, or a statutory penalty parameter.

3. The system of claim 1, wherein the predefined data element categories comprise a plurality of atomic data element classes corresponding to legally regulated information types, and wherein the association in step (c) maps each obligation clause to one or more of the atomic data element classes.

4. The system of claim 1, wherein the obligation graph data structure further comprises temporal attributes representing effective dates, sunset dates, or amendment dates of the obligation objects, and wherein propagation in step (e) is constrained based on the temporal attributes.

5. The system of claim 1, wherein the parsing in step (b) comprises identifying statutory thresholds that condition applicability of an obligation clause based on at least one of: a quantity of affected individuals, a type of data element category, or a likelihood of harm.

6. The system of claim 1, wherein the determination in step (f) further comprises resolving conflicts among multiple propagated obligation objects arising from different jurisdictions by selecting compliance actions satisfying a most restrictive applicable requirement.

7. The system of claim 1, wherein the metadata describing affected data element categories excludes personally identifiable record-level data and instead comprises categorical indicators of data presence, exposure likelihood, or system impact.

8. The system of claim 1, wherein the system is configured to generate different compliance outputs for regulator-facing reports and individual-facing notices based on the propagated machine-interpretable obligation objects.

9. The system of claim 1, wherein the propagation in step (e) includes deriving compliance obligations for a first entity based on an incident associated with a second entity that maintains custody or control over data on behalf of the first entity.

10. The system of claim 1, wherein the compliance output comprises a structured export file formatted for ingestion by an external system associated with a breach notification service provider or a regulatory reporting authority, the structured export file comprising at least affected jurisdiction identifiers, reporting deadlines, affected data element categories, and recipient grouping fields, wherein the structured export file is in a comma-separated value (CSV) format, a JavaScript Object Notation (JSON) format, or an extensible markup language (XML) format.

11. The system of claim 1, wherein the system generates a cryptographic seal for at least one of the compliance output or an audit log, the cryptographic seal comprising a cryptographic hash and a trusted timestamp, such that subsequent modification of the compliance output or audit log is detectable.

12. A computer-implemented method for determining legally constrained compliance obligations, the method comprising:

(a) ingesting, by one or more processors, statutory and regulatory source text from a plurality of jurisdictions;

(b) parsing, by the one or more processors, the ingested statutory and regulatory source text at a clause level to identify legally operative obligation clauses, and extracting each identified obligation clause as a machine-interpretable obligation object comprising at least a jurisdictional scope, a triggering condition, and a compliance requirement;

(c) associating, by the one or more processors, each machine-interpretable obligation object with one or more predefined data element categories representing classes of information regulated by the obligation clause;

(d) generating, by the one or more processors, an obligation graph data structure comprising: (i) nodes representing entities, data element categories, obligation objects, and incidents, and (ii) edges representing legally relevant relationships including custody, control, exposure, jurisdictional applicability, or statutory linkage;

(e) propagating, by the one or more processors, the machine-interpretable obligation objects through the obligation graph data structure based on the edges to determine compliance obligations applicable to a given entity and incident, including propagation across third-party or fourth-party relationships;

(f) determining, by the one or more processors and using the propagated machine-interpretable obligation objects, legally constrained compliance actions required of the given entity, wherein the method is performed using a predefined, machine-interpretable data structure comprising metadata describing data element categories and obligation objects, upon which the obligation graph data structure is generated and operated, wherein the method is constrained to operate on the data structure rather than on underlying record-level data, and wherein the determining is performed without requiring access to record-level data associated with the incident and instead relies on metadata describing affected data element categories; and (g) generating, by the one or more processors, a compliance output comprising jurisdiction-specific legally sufficient instructions, notices, or reports corresponding to the determined compliance actions, wherein the compliance output is generated by performing a deterministic transformation of the data structure.

13. The method of claim 12, wherein parsing the statutory and regulatory source text in step (b) comprises identifying statutory thresholds conditioning applicability of an obligation clause based on at least one of a quantity of affected individuals, a category of regulated data, or a likelihood-of-harm criterion.

14. The method of claim 12, wherein associating the machine-interpretable obligation objects in step (c) comprises mapping each obligation object to a plurality of atomic data element categories corresponding to legally regulated information types.

15. The method of claim 12, wherein generating the obligation graph data structure in step (d) further comprises assigning temporal attributes to obligation objects representing effective dates, amendment dates, or expiration dates.

16. The method of claim 15, wherein propagating the obligation objects in step (e) is constrained based on the temporal attributes to exclude inapplicable or superseded obligations.

17. The method of claim 12, further comprising operating in a degraded mode when statutory source text or incident metadata is partially unavailable and generating provisional compliance outputs flagged as conditional.

18. The method of claim 17, wherein the provisional compliance outputs include indicators identifying assumptions, inferred conditions, or data gaps used in determining the compliance actions.

19. The method of claim 12, further comprising recording, in an audit log configured to support reconstruction of the compliance output generation for regulatory inquiry or litigation, at least: statutory sources ingested, statutory source version identifiers, obligation objects generated, obligation object version identifiers, propagation paths applied, metadata inputs used, and compliance outputs generated.

20. A computer-implemented compliance determination system comprising: one or more processors and one or more non-transitory computer-readable storage media storing instructions that, when executed by the one or more processors, cause the system to:

(a) execute an extraction agent configured to ingest statutory and regulatory source text from a plurality of jurisdictions and extract clause-level legally operative obligation clauses as machine-interpretable obligation objects;

(b) execute a validation agent configured to verify the extracted obligation objects by comparison against at least one secondary statutory source, prior statutory version, or predefined validation rule set;

(c) execute a synthesis agent configured to assemble validated obligation objects into compliance outputs constrained by jurisdiction-specific legal requirements;

(d) maintain a shared obligation repository comprising versioned obligation objects accessible to the extraction agent, validation agent, and synthesis agent;

(e) generate, using the synthesis agent, legally constrained compliance outputs for a given entity and incident by propagating the validated obligation objects across relationships representing custody, control, or jurisdictional applicability, wherein the system comprises a predefined, machine-interpretable data structure comprising metadata describing data element categories and obligation objects, upon which the obligation graph data structure is generated and operated, wherein the system is constrained to operate on the data structure rather than on underlying record-level data; and (f) record, in an audit log, agent actions, obligation object versions, and propagation paths sufficient to reconstruct generation of the compliance outputs, wherein the compliance outputs are generated by performing a deterministic transformation of the data structure.

21. The system of claim 20, wherein the extraction agent is configured to perform clause-level parsing by identifying statutory verbs, conditions, and enforcement triggers indicative of legally operative obligations.

22. The system of claim 20, wherein the validation agent applies multiple validation techniques including cross-source comparison, version-delta analysis, and rule-based consistency checks.

23. The system of claim 20, wherein the validation agent is configured to flag extracted obligation objects as uncertain, incomplete, or conflicting based on validation outcomes.

24. The system of claim 20, wherein the shared obligation repository maintains version identifiers and effective-date metadata for each obligation object.

25. The system of claim 20, wherein the audit log records agent-specific actions including extraction events, validation decisions, synthesis operations, and propagation paths.

26. A non-transitory computer-readable storage medium storing instructions that, when executed by one or more processors, cause the one or more processors to perform operations comprising:

(a) ingesting statutory and regulatory source text from a plurality of jurisdictions;

(b) parsing the statutory and regulatory source text at a clause level to generate machine-interpretable obligation objects comprising jurisdictional scope, triggering conditions, and compliance requirements;

(c) associating the obligation objects with predefined data element categories representing regulated classes of information;

(d) propagating the obligation objects across relationships representing entity custody, control, exposure, or jurisdictional applicability to determine compliance obligations applicable to an incident;

(e) determining legally constrained compliance actions without accessing record-level data associated with the incident and instead relying on metadata describing affected data element categories, wherein the operation is performed using a predefined, machine-interpretable data structure comprising metadata describing data element categories and obligation objects, upon which the obligation graph data structure is generated and operated, and wherein the operation is constrained to operate on the data structure rather than on underlying record-level data; and (f) generating jurisdiction-specific compliance outputs corresponding to the determined compliance actions, wherein the compliance outputs are generated by performing a deterministic transformation of the data structure.

27. The non-transitory computer-readable storage medium of claim 26, wherein parsing the statutory and regulatory source text comprises identifying statutory thresholds conditioning applicability of an obligation clause.

28. The non-transitory computer-readable storage medium of claim 26, wherein associating obligation objects with predefined data element categories comprises mapping each obligation object to atomic data element classes corresponding to legally regulated information types.

29. The non-transitory computer-readable storage medium of claim 26, wherein determining the legally constrained compliance actions is performed using metadata excluding record-level personal data.

30. The non-transitory computer-readable storage medium of claim 26, wherein the operations further comprise exporting compliance outputs and obligation objects in a machine-readable format for ingestion by an external governance, risk, or incident-management system.

* * * * *